(12) United States Patent
Ulm et al.

(10) Patent No.: US 11,349,682 B2
(45) Date of Patent: May 31, 2022

(54) SYSTEMS AND METHODS FOR POWER SAVINGS IN HFC AMPLIFIERS

(71) Applicant: ARRIS Enterprises LLC, Suwanee, GA (US)

(72) Inventors: John Ulm, Pepperell, MA (US); Gregory J. Cyr, Winfield, IL (US); Venkatesh G. Mutalik, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/028,668

(22) Filed: Sep. 22, 2020

(65) Prior Publication Data

US 2021/0176082 A1     Jun. 10, 2021

Related U.S. Application Data

(63) Continuation of application No. 16/709,632, filed on Dec. 10, 2019, now Pat. No. 10,785,048, which is a continuation of application No. 15/845,121, filed on Dec. 18, 2017, now Pat. No. 10,523,459.

(51) Int. Cl.
*H04L 12/28* (2006.01)
(52) U.S. Cl.
CPC .............................. *H04L 12/2801* (2013.01)
(58) Field of Classification Search
CPC .. H04L 12/2801; H04L 43/045; H04W 52/22; H04W 72/082
See application file for complete search history.

(56) References Cited

U.S. PATENT DOCUMENTS

| | | | |
|---|---|---|---|
| 6,598,232 B1* | 7/2003 | McAlear | H04N 7/102 348/E7.052 |
| 9,191,064 B2 | 11/2015 | Schemmann et al. | |
| 2005/0058082 A1 | 3/2005 | Moran, III et al. | |
| 2010/0074167 A1 | 3/2010 | Dale et al. | |
| 2010/0131999 A1* | 5/2010 | Kfir | H04N 21/6168 725/111 |
| 2011/0280238 A1 | 11/2011 | Kreuzer et al. | |
| 2013/0294377 A1 | 11/2013 | Quigley et al. | |
| 2015/0049822 A1* | 2/2015 | Schemmann | H03F 3/20 375/257 |
| 2018/0109319 A1* | 4/2018 | Jones | H04B 10/564 |
| 2020/0314510 A1* | 10/2020 | Fagerlund | H04B 10/25751 |

OTHER PUBLICATIONS

Nevo, A., et al., "Usage-Based Pricing and Demand for Residential Broadband", Econometrica, Oct. 2015.

* cited by examiner

*Primary Examiner* — Freshteh N Aghdam
(74) *Attorney, Agent, or Firm* — Chernoff, Vilhauer, McClung & Stenzel, LLP

(57) ABSTRACT

Methods and systems that reduce power usage in a CATV network. Power usage may be reduced by temporally adjusting the power output of amplifiers in the network. The power output of one or more amplifiers in the network are preferably adjusted based on patterns of temporal usage of the network.

19 Claims, 6 Drawing Sheets

OVERALL HFC SYSTEM BLOCK DIAGRAM

| Code | Upper Frequency | Modulation Order |
|------|-----------------|------------------|
| 000 | 750 MHz | Maximum: e.g. QAM = 256, OFDM = 4096 |
| 001 | 870 MHz | Maximum: e.g. QAM = 256, OFDM = 4096 |
| 010 | 1002 MHz | Maximum: e.g. QAM = 256, OFDM = 4096 |
| 011 | 1218 MHz | Maximum: e.g. QAM = 256, OFDM = 4096 |
| 100 | 750 MHz | Reduced: e.g. QAM = 64, OFDM = 256 |
| 101 | 870 MHz | Reduced: e.g. QAM = 64, OFDM = 256 |
| 110 | 1002 MHz | Reduced: e.g. QAM = 64, OFDM = 256 |
| 111 | 1218 MHz | Reduced: e.g. QAM = 64, OFDM = 256 |

FIG. 4

OVERALL HFC SYSTEM BLOCK DIAGRAM

SYSTEMS AND METHODS FOR POWER SAVINGS IN HFC AMPLIFIERS

CROSS REFERENCE TO RELATED APPLICATIONS

The present application is a continuation of U.S. patent application Ser. No. 16/709,632 filed Dec. 10, 2019, now U.S. Pat. No. 10,785,048 issued Sep. 22, 2020, which is a continuation of U.S. patent application Ser. No. 15/845,121 filed Dec. 18, 2107, now U.S. Pat. No. 10,523,459 issued Dec. 31, 2019, the contents of which are incorporated herein by reference in their entirety.

BACKGROUND

A cable television (CATV) system is capable of providing a variety of media content, such as video, data, voice, or high-speed Internet services to subscribers. The CATV provider typically delivers the media content from a head end to its subscriber's client devices over a transmission network such as a coaxial network, a fiber optic network, or a hybrid fiber/coax (HFC) network. Requirements for data throughput (or bandwidth) in these CATV networks are growing exponentially as customers demand more content, data services, etc. Though improvements in encoding efficiencies and transport protocols have thus far allowed cable operators to keep pace with subscriber and competitive demands, it is important to continue the analysis of the various network elements that can enhance or inhibit the overall performance of next-generation cable networks.

One network element that constrains performance of cable networks is power consumption, which rises dramatically as demand for more services and higher quality service rises. Recent analyses have shown that power consumption between the head end and the end user accounts for the vast majority of power that MSOs consume. Specifically, as much as 83% of cable's overall energy consumption is consumed by hubs, head ends, and active power elements along the HFC network.

Therefore, it would be desirable to reduce power usage in a HFC network without compromising output signal power in relation to noise.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings:

FIG. 4 shows an exemplary technique for modulating the power in a node among more than two levels.

Figure 1:
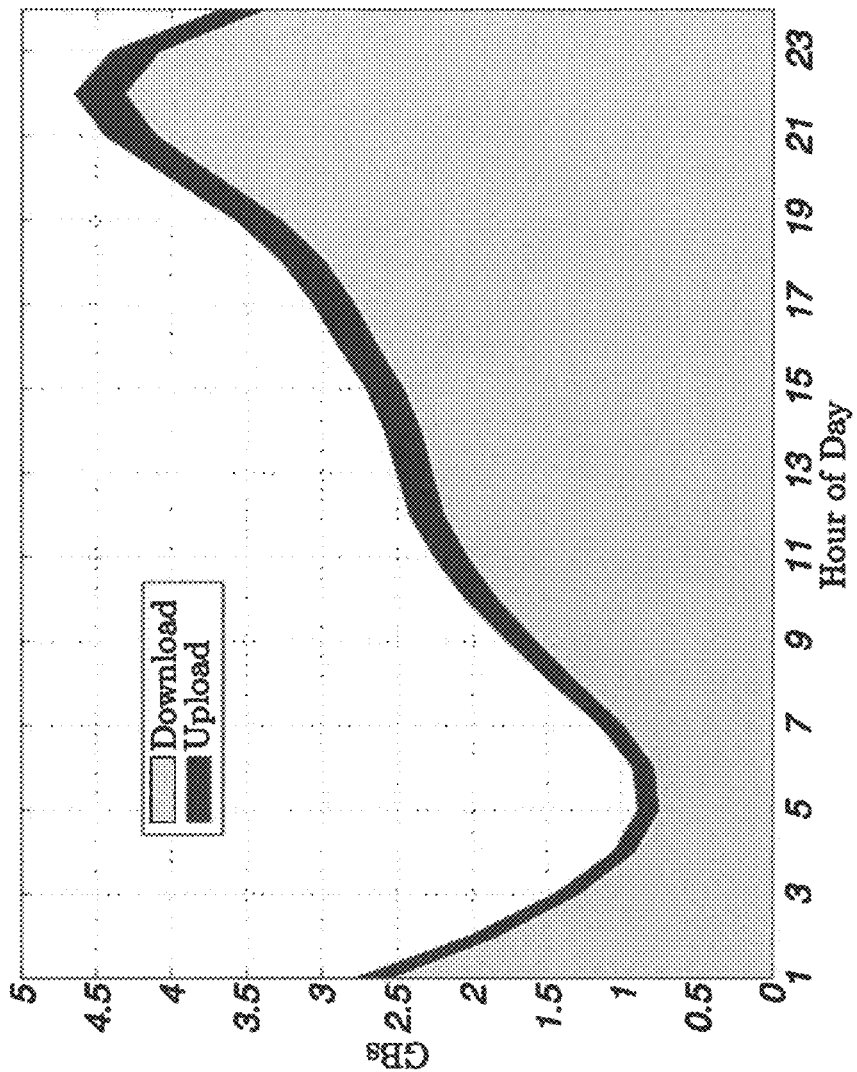
FIG. 1 shows an exemplary distribution profile of hourly usage in a CATV system.

It should be understood that, while the accompanying figures illustrate embodiments that include the portions of the disclosure claimed, and explain various principles and advantages of those embodiments, the details displayed are not necessary to understand the illustrated embodiments, as the details depicted in the figures would be readily apparent to those of ordinary skill in the art having the benefit of the present disclosure.

DETAILED DESCRIPTION

The present disclosure describes systems and methods that reduce power consumption in a CATV network.

As noted earlier, a large proportion of the total power usage by a CATV provider is consumed along the transmission path between a head end and a customer, and particularly by active elements such as amplifiers. Most of the radio frequency (RF) amplifiers within the cable television network operate in what is referred to as a "class A" mode of operation, which provides a very high fidelity signal, often quantified in terms of signal-to-noise and signal-to-2nd, 3rd, 4th, 5th . . . harmonic distortion products. However, the power consumption costs for the class A mode of operation is on the order of 100 times higher than the composite power of an RF output signal. This higher power consumption results from the need to accommodate significant and frequent 'peak to average' deviations from the effective signal power, which may include setting the output RF rms amplitude of the amplifier at no more than roughly 25% of the output rail-to-rail range of either voltage or current, depending on the implementation. The higher demand for power consumption drives up the cost of cable network products that require RF gain blocs (e.g., head end optical transmitters and receivers, fiber-optic nodes, RF distribution amplifiers). Thus, it is desirable to reduce the power dissipation in a CATV network.

One might think that, if an amplifier is not transmitting power on a channel, its power output is automatically reduced. This does not occur with Class A amplifiers, however, which dissipate a virtually constant power independent of the number of channels it transmits because the amplifier is biased with a signal intended to correspond to the peak amplitude of the signals it amplifies. Thus, to reduce the power consumption in a class A amplifier, a method such as reducing the bias current and/or operating voltage is required, which adjusts the maximum RF output power capability of the amplifier for the desired RF quality using a metric such as MER.

To this end, a number of techniques have been proposed to modify the bias point of CATV amplifiers, or the signals they transmit so as to conserve power. Such techniques include Envelope Tracking (ET) and Digital Pre-Distortion (DPD) techniques, which show promise for significant improvements in energy efficiency. However, these techniques require a very tight high speed, closed-loop system with sub-microsecond response times. While this might be achievable for a Distributed Access Architecture (DAA) with a digital link such as Remote PHY or Remote MAC-PHY, where the Digital Analog Converter (DAC) is physically adjacent the amplifier, it is not suitable for Centralized Access Architectures (CAA) where the DAC may be separated from the amplifiers by long distances, and the amplifier housing receives a broadband RF signal.

Figure 2:
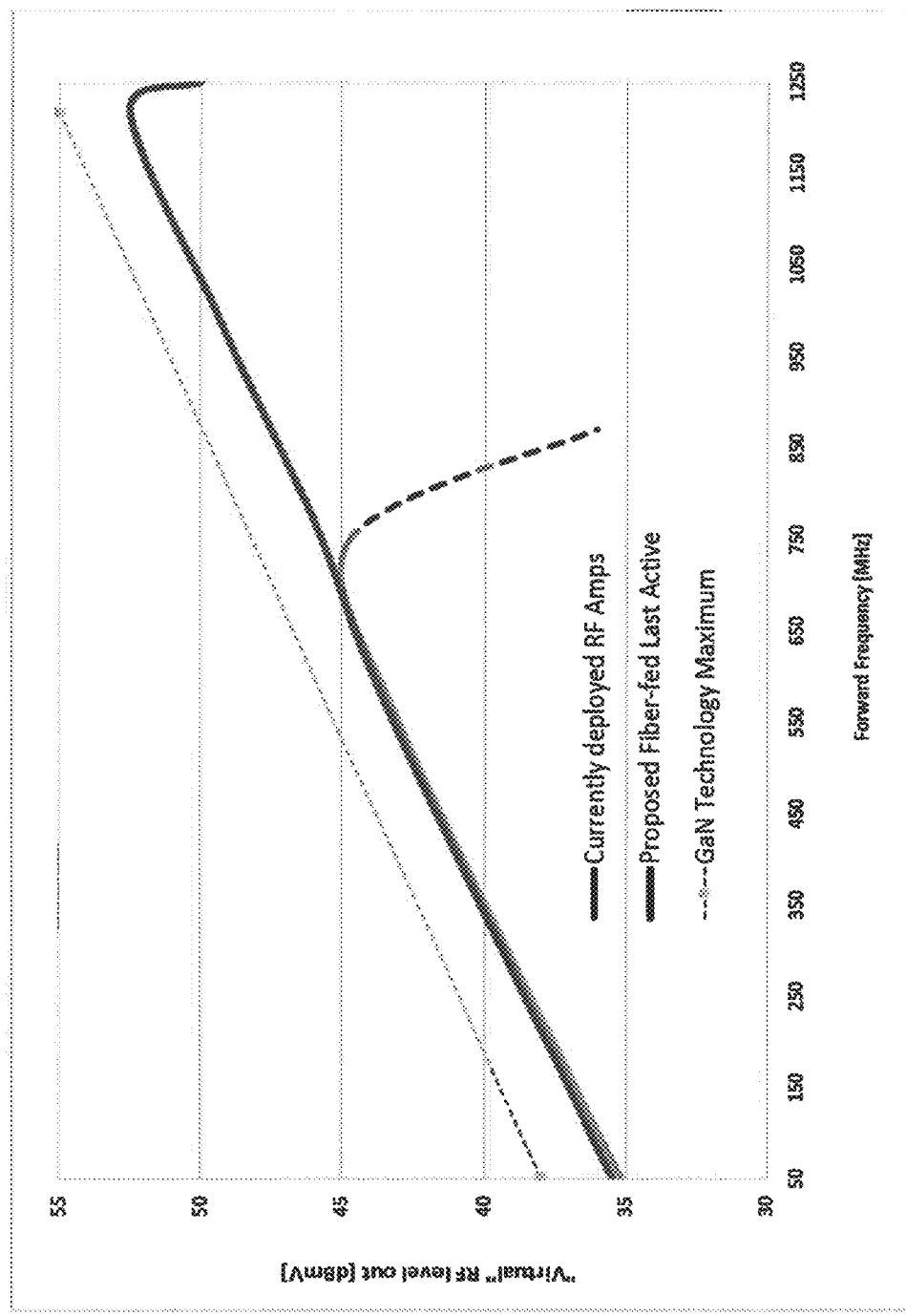
FIG. 2 shows different "virtual" RF level outputs needed for respective forward frequencies used to deliver CATV content.

Referring to FIG. 1, which shows an exemplary daily broadband usage patterns, usage of a CATV network varies considerably over a day, typically in predictable, repetitive patterns. In the example shown, downstream capacity peak is more than four times that of the overnight low, and if the 24-hour period is segmented into quartiles, roughly 10 hours is spent in the 25-50% band; 10 hours in the 50-75% band and 4 hours in the 75-100% band. Thus, the present inventors realized that, even where a node or amplifier is capable of a high frequency, high power of operation, e.g. 1.2 GHz, that node may well be able to operate at a lower power of operation during predictable intervals of a day. Similar circumstances may arise, for example, when a system with MoCA filters deployed at a customer's point of entry prevents the use of higher DOCSIS 3.1 frequencies (e.g. 1002-1218 MHz). Such modulations may result in significant power savings. FIG. 2 shows the "virtual" RF level output needed for different forward frequencies. As can be seen, a 1218 MHz DOCSIS 3.1 system requires significantly higher output levels than a traditional 750 MHz system. Thus, by virtually reducing the capacity provided during intervals or conditions where the higher capacity is not necessary may achieve significant reductions in power consumption.

Accordingly, a novel technique of reducing power consumption in a node may reduce power during non-peak bandwidth usage, e.g. the 20-hour window outside the peak period. This may be accomplished using any one or more of several techniques. First, for example, during periods of relatively low activity, traffic may be consolidated onto fewer channels, and unused DOCSIS/QAM channels may be turned off. In some embodiments, channels at higher frequencies which require more power due to higher coax losses are turned off in favor of channels at lower frequencies. Alternatively, the order of modulation on a given channel may be reduced, which allows output power to be reduced while maintaining the same SNR levels. Thus, for example, a QAM/DOCSIS 3.0 modulation may be changed from 256-QAM to 64-QAM to achieve a 6-7 dB reduction in required output power at the same SNR with 75% of the capacity. As another example, a DOCSIS 3.1 modulation may be changed from 4096-QAM to 256-QAM to achieve a 12-14 dB reduction in required output power at the same SNR with 66.6% of the capacity. Note that some QAM channels such as digital broadcast may need to remain at a fixed modulation while other QAM channels such as DOCSIS 3.0 with varying capacity may be adapted to different modulation orders.

Figure 3:
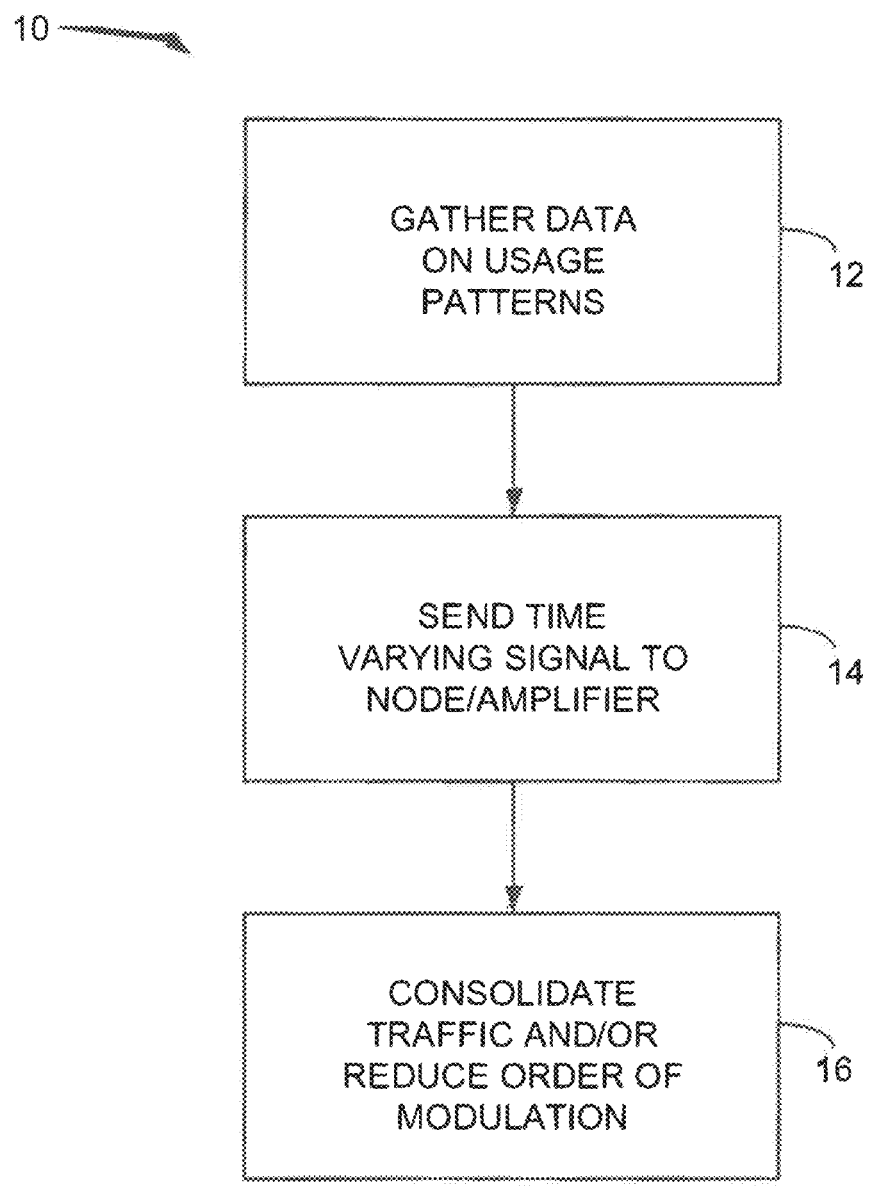
FIG. 3 shows an exemplary method for reducing power levels in an amplifier/node of a CATV network.

Referring to FIG. 3, one exemplary method 10 to modulate the power consumption in a CATV system would begin at step 12 where information would be determined regarding data usage patterns. In step 14, the usage patterns are used to determine a time-varying signal that modulates one or more characteristics of the CATV system at step 16. For example, the time-varying signal may be used by a head end to reduce the number of channels sent to downstream nodes/amplifiers or reduce the order of modulation of the channels. Simultaneously, the nodes/amplifiers may adjust output power and/or bias level to correspond to the reduced number of channels or reduced order of modulation.

Because such patterns are usually predictable, daily patterns may be predetermined and used repetitively over sequential days. For example, a head end could send signals to a node/amplifier at predetermined times of the day. Alternatively, data usage may be measured over a shorter interval, even instantaneously. For example, detection circuitry in both a head end and a housing of an amplifier/node may each independently sense instantaneous RF bandwidth, or other relevant metrics indicative the amount of bandwidth that is actually being used. The headend could reduce the number of channels and/or modulation orders used and the amplifier/node could autonomously adjust its output power for the new RF bandwidth.

Those of ordinary skill in the art will appreciate that the disclosed method may be tailored to provide any number of levels or tiers of power consumption. For example, during peak times, the method may provide operation as a full 1218 MHz system with full bandwidth capacity capabilities at maximum modulation orders. During shoulder times, the system could operate as a 1002 MHz system or with reduced modulation orders, and during off-peak times the system could operates as a 750 MHz system with reduced modulation orders. Referring to FIG. 4, for example, in an embodiment 50 where a head end sends a downstream signal based on a predetermined pattern of usage during a day, different signals or codes may effectuate different power levels. Thus, for instance a code of "011" may correspond to normal "full" operation of the system, e.g. 1218 MHz. at maximum modulation orders. A code of "010" may signal that traffic is to be consolidated to eliminate channels associated with the highest frequencies, so as to attain a 1002 MHz system. A code of "001" or "000" can reduce the upper frequency even further to 870 or 750 MHz respectively. Alternatively, a code of "111" may signal that the QAM modulation orders of the channels are reduced, at all of the available channels, to reduce both capacity and power consumption in a 1218 MHz system. A code of "110", "101" or "100" may signal that traffic is to be consolidated to eliminate channels associated with the highest frequencies and that the remaining channels will operate at a lower QAM level to attain a system of 1002, 870 or 750 MHz respectively. Further fine-tuning can be achieved simply by having finer gradations of consolidation and/or QAM levels.

The disclosed method provides flexibility in several important respects. First, changes in usage are very slow compared to network speeds, hence the amplifier/node output power might only need to be modulated a handful of times per day. Therefore, implementation of the method merely needs a very low bandwidth link, which should translate into lower costs and power. Second, disclosed method does not require two-way communication. Because of the slow time varying nature of updates, the power information can be repeatedly broadcast. Those of ordinary skill in the art will appreciate, however, that a two-way communication link might be beneficial for implementing energy management protocols such as SCTE EMS APSIS, but as just noted, bidirectional communication is not required.

Furthermore, implementation of a power control system to implement the disclosed system can also operate in complete isolation. As already noted for example, detection circuitry in both a head end and a housing of an amplifier/node may independently sense usage and adjust performance to implement a lower power output.

Figure 5:
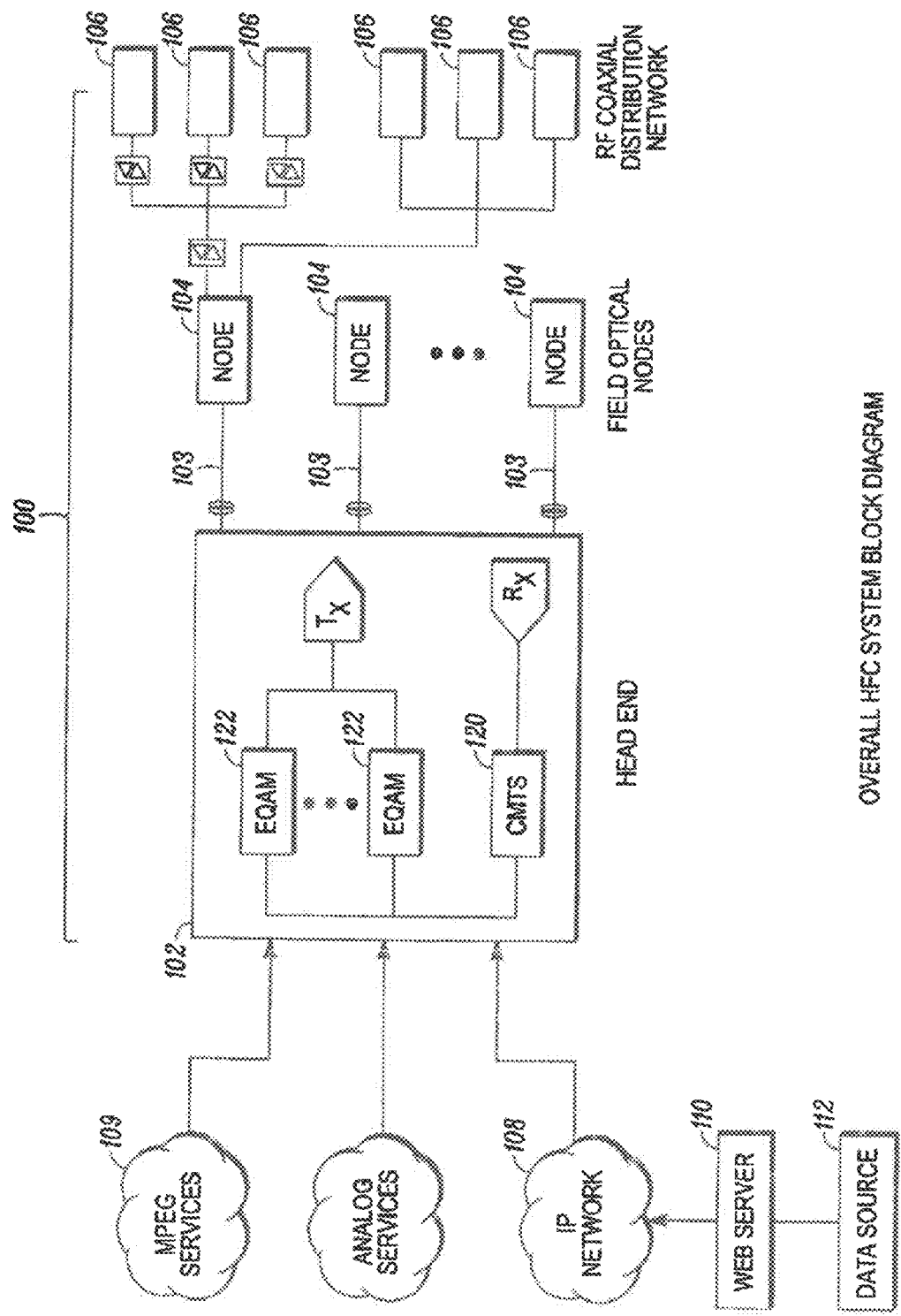
FIG. 5 shows an exemplary architecture to implement the method shown in FIG. 3.

FIG. 5 shows an exemplary cable television (CATV) system 100 operable to deliver high-definition digital entertainment and telecommunications such as video, voice, and high-speed Internet services using the disclosed method. Generally speaking, the CATV system 100 refers to the operational (e.g., geographical) footprint of an entertainment and/or information services franchise that provides entertainment and/or information services to a subscriber base spanning one or more towns, a region, or a portion thereof. Particular entertainment and/or information services offered by the franchise (e.g., entertainment channel lineup, data packages, etc.) may differ from system to system. Some large cable companies operate several cable communication systems (e.g., in some cases up to hundreds of systems), and are known generally as Multiple System Operators (MSOs).

The cable network can take the form of an all-coax, all-fiber, or hybrid fiber/coax (HFC) network, e.g., fiber to the last amplifier (FTTLA). For purposes of illustration only, FIG. 1 depicts a hybrid fiber-coaxial (HFC) network. An HFC network is a broadband network that combines optical fiber and coaxial cable, strategically placing fiber nodes to provide services to a plurality of homes. It should be understood that the systems and methods disclosed in the present application may be employed in various networks and the HFC network is merely shown as a non-limiting example.

The network shown in FIG. 5 is an HFC broadband network that combines the use of optical fiber and coaxial connections. The network includes a head end 102 that receives analog video signals and digital bit streams representing different services (e.g., video, voice, and Internet) from various digital information sources. For example, the head end 102 may receive content from one or more video on demand (VOD) servers, IPTV broadcast video servers, Internet video sources, or other suitable sources for providing IP content.

An IP network 108 may include a web server 110 and a data source 112. The web server 110 is a streaming server that uses the IP protocol to deliver video-on-demand, audio-on-demand, and pay-per view streams to the IP network 108. The IP data source 112 may be connected to a regional area or backbone network (not shown) that transmits IP content. For example, the regional area network can be or include the Internet or an IP-based network, a computer network, a web-based network or other suitable wired or wireless network or network system.

At the head end 102, the various services are encoded, modulated and up-converted onto RF carriers, combined onto a single electrical signal and inserted into a broadband optical transmitter. A fiber optic network extends from the cable operator's master/regional head end 102 to a plurality of fiber optic nodes 104. The head end 102 may contain an optical transmitter or transceiver to provide optical communications through optical fibers 103. Regional head ends and/or neighborhood hub sites may also exist between the head end and one or more nodes. The fiber optic portion of the example HFC network 100 extends from the head end 102 to the regional head end/hub and/or to a plurality of nodes 104. The optical transmitter converts the electrical signal to a downstream optically modulated signal that is sent to the nodes. In turn, the optical nodes convert inbound signals to RF energy and return RF signals to optical signals along a return path. In the specification, the drawings, and the claims, the terms "forward path" and "downstream" may be interchangeably used to refer to a path from a head end to a node, a node to a subscriber, or a head end to a subscriber. Conversely, the terms "return path", "reverse path" and "upstream" may be interchangeably used to refer to a path from a subscriber to a node, a node to a head end, or a subscriber to a head end. Also, in the specification, in the drawings, and the claims a node may be any digital hub between a head end and a customer home that transports local requests over the CATV network. Forward path optical communications over the optical fiber may be converted at the nodes to Radio Frequency (RF) communications for transmission over the coaxial cable to the subscribers. Conversely, return path RF communications from the subscribers are provided over coaxial cables and are typically converted at a node to optical signals for transmission over the optical fiber to the head end. Each node 104 may contain a return path transmitter that is able to relay communications upstream from a subscriber device 106 to the head end 102.

Each node 104 serves a service group comprising one or more customer locations. By way of example, a single node 104 may be connected to thousands of cable modems or other subscriber devices 106. In an example, a fiber node may serve between one and two thousand or more customer locations. In an HFC network, the fiber optic node 104 may be connected to a plurality of subscriber devices 106 via coaxial cable cascade 111, though those of ordinary skill in the art will appreciate that the coaxial cascade may comprise a combination of fiber optic cable and coaxial cable. In some implementations, each node 104 may include a broadband optical receiver to convert the downstream optically modulated signal received from the head end or a hub to an electrical signal provided to the subscribers' devices 106 through the coaxial cascade 111. Signals may pass from the node 104 to the subscriber devices 106 via the RF cascade 111, which may be comprised of multiple amplifiers and active or passive devices including cabling, taps, splitters, and in-line equalizers. It should be understood that the amplifiers in the RF cascade 111 may be bidirectional, and may be cascaded such that an amplifier may not only feed an amplifier further along in the cascade but may also feed a large number of subscribers. The tap is the customer's drop interface to the coaxial system. Taps are designed in various values to allow amplitude consistency along the distribution system.

The subscriber devices 106 may reside at a customer location, such as a home of a cable subscriber, and are connected to the cable modem termination system (CMTS) 120 or comparable component located in a head end. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or similar electronic client, end, or terminal devices of subscribers. For example, cable modems and IP set top boxes may support data connection to the Internet and other computer networks via the cable network, and the cable network provides bi-directional communication systems in which data can be sent downstream from the head end to a subscriber and upstream from a subscriber to the head end.

The techniques disclosed herein may be applied to systems compliant with DOCSIS. The cable industry developed the international Data Over Cable System Interface Specification (DOCSIS®) standard or protocol to enable the delivery of IP data packets over cable systems. In general, DOCSIS defines the communications and operations support interface requirements for a data over cable system. For example, DOCIS defines the interface requirements for cable modems involved in high-speed data distribution over cable television system networks. However, it should be understood that the techniques disclosed herein may apply to any system for digital services transmission, such as digital video or Ethernet PON over Coax (EPoc). Examples herein referring to DOCSIS are illustrative and representative of the application of the techniques to a broad range of services carried over coax.

References are made in the present disclosure to a Cable Modem Termination System (CMTS) in the head end 102. In general, the CMTS is a component located at the head end or hub site of the network that exchanges signals between the head end and client devices within the cable network infrastructure. In an example DOCSIS arrangement, for example, the CMTS and the cable modem may be the endpoints of the DOCSIS protocol, with the hybrid fiber coax (HFC) cable plant transmitting information between these endpoints. It will be appreciated that architecture 100 includes one CMTS for illustrative purposes only, as it is in fact customary that multiple CMTSs and their Cable Modems are managed through the management network.

The CMTS 120 hosts downstream and upstream ports and contains numerous receivers, each receiver handling communications between hundreds of end user network elements connected to the broadband network. For example, each CMTS 120 may be connected to several modems of many subscribers, e.g., a single CMTS may be connected to hundreds of modems that vary widely in communication characteristics. In many instances several nodes, such as fiber optic nodes 104, may serve a particular area of a town or city. DOCSIS enables IP packets to pass between devices on either side of the link between the CMTS and the cable modem.

It should be understood that the CMTS is a non-limiting example of a component in the cable network that may be used to exchange signals between the head end and subscriber devices 106 within the cable network infrastructure. For example, other non-limiting examples include a Modular CMTS (M-CMTS™) architecture or a Converged Cable Access Platform (CCAP).

An EdgeQAM (EQAM) 122 or EQAM modulator may be in the head end or hub device for receiving packets of digital content, such as video or data, re-packetizing the digital content into an MPEG transport stream, and digitally modulating the digital transport stream onto a downstream RF carrier using Quadrature Amplitude Modulation (QAM). EdgeQAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Orthogonal frequency-division multiplexing (OFDM) may utilize smaller subcarriers (compared to QAM carriers). For example, while a conventional DOCSIS QAM carrier is 6 MHz wide, the CATV system may employ orthogonal frequency division multiplexing (OFDM) technology with OFDM carriers that are approximately 25 kHz to 50 kHz wide. Thus, where previously 100 QAM carriers were used, thousands of OFDM subcarriers may be used. OFDM technology may be suitable for noisy signal conditions and may enable use of more of the available spectrum without reducing the quality of server. In example implementations, a cable network may use the QAM modulation for downstream speeds and boost upstream speeds using OFDM.

Figure 6:
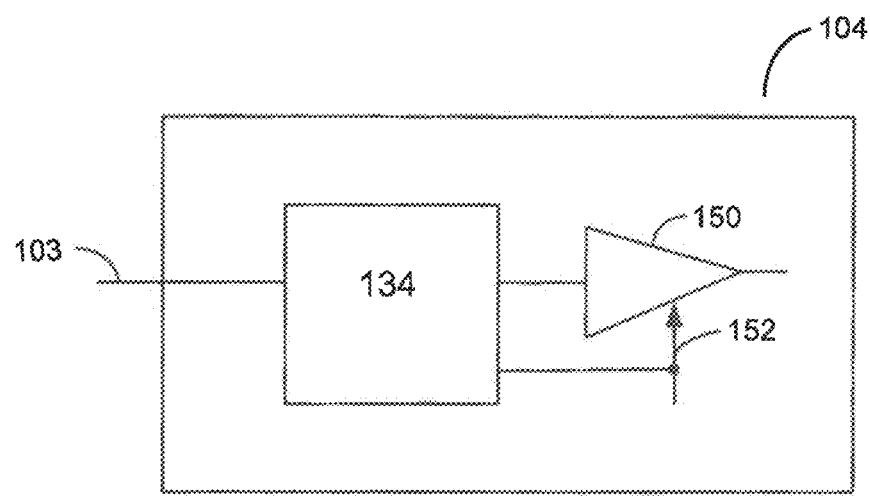
FIG. 6 shows an exemplary amplifier/node in the architecture of FIG. 5.

FIG. 6 shows an exemplary node 104 of the HFC network 100. The node 104 may have an amplifier 130 that receives a bias signal 132 and amplifies an downstream signal 103 from a head end, which may include an RF signal, a digital signal converted to an RF signal by a DAC (not shown) in the node 104, or a combination of RF and digital signals (e.g. an RF signal for downstream content and a digital communication signal containing control information, Internet content, etc.). Preferably, the node 104 includes a controller 134 used to modulate the input signal to the amplifier 130, the bias level 132 of the amplifier, or both, according to one or more of the methods previously discussed. For example, the controller 134 may receive a control code from the head end inside the signal 134 and modulate the bias and/or operating voltages of the amplifier 130 accordingly. The control code from the head end 102 may, in some embodiments, be included in an out-of-band (OOB) links used by STBs. Alternatively, since the bandwidth requirements of the disclosed techniques are so low, some embodiments could leverage DOCSIS 3.1 technology to provide a control signal since only one carrier, or a small number of subcarriers, would be needed to convey the required information. The DOCSIS 3.1 specification could be augmented to pass this control information down the existing PHY Link Control (PLC) channel. Still other such embodiments could embed the power control information into DOCSIS 3.1 pilots, e.g. embedded inside the QPSK patterns within a pilot or other unique pilot patterns. Alternatively, a proprietary link could be created using a single sub-carrier.

Still another embodiment could place a DOCSIS cable modem chip in the housing of the node 104, i.e. controller 134 could be a DOCSIS cable modem chip. With such a chip included, the HFC amplifier/node can become a managed device and utilize protocols such as SCTE EMS APSIS.

In some embodiments, if the node 104 does not receive a signal over a predetermined interval, then the power control system defaults to full bandwidth/power until communication is re-established. In this mode, the controller 134 may still be able to detect the presence or absence of carriers in the upper frequency channels, and set the upper frequency bound of the node with an appropriate amplifier bias level.

Preferably, the amplifier 130 in the node 104 would operate at a constant efficiency for the same RF quality. Thus, for every dB of RF output power reduction, the RF amplifier bias and/or voltage would be adjusted and save 1 dB of power consumption. Alternatively, the gain of the amplifier may be constant regardless of the change in RF amplifier bias and/or voltage. Preferably, both of these implementations are characterized in advance, and employ a look-up table to control settings and/or use feedback to assure proper operation.

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. "Disk" and "disc" as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses. Various components, modules, or units are described in this disclosure to emphasize functional aspects of components configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for adjusting power usage of a Cable TV (CATV) network, the method comprising selectively changing order of modulation of at least one downstream Quadrature Amplitude Modulation (QAM) channel in the CATV network, and sending a signal to downstream device, the signal used by the downstream device to reduce power based on the changed order of modulation.

2. The method of claim 1 where the step of changing the order of modulation of at least one downstream channel changes available capacity of the CATV network.

3. The method of claim 2 including the step of consolidating channels and reducing the upper frequency bound of downstream content amplified by the amplifier.

4. The method of claim 2 including the step of temporally modulating power of an amplifier in the downstream device.

5. The method of claim 1 where the signal is based upon a temporal pattern of usage of the CATV network.

6. The method of claim 5 where the temporal pattern of usage is determined at a head end and the head end sends the signal.

7. The method of claim 5 where the signal is used to modulate the bias point of an amplifier in the downstream device.

8. The method of claim 7 where a head end independently determines the temporal pattern of usage and modulates the signal to the downstream device to communicate a mode of operation.

9. A device in a Cable TV (CATV) network downstream from a head end, the device comprising:
   (a) an input for receiving a first downstream signal and a second downstream signal, the first downstream channel being a Quadrature Amplitude Modulation (QAM) channel, the second downstream signal varying based upon a selectively changing order of modulation of the first downstream signal;
   (b) an amplifier for amplifying the first downstream signal; and
   (c) a controller capable of adjusting power consumed by the device by using the second downstream signal.

10. The device of claim 9 including a Data over Cable Service Interface Specification (DOCSIS) cable modem chip.

11. The device of claim 9 where the second signal varies based on a temporally varying magnitude of usage of the CATV system.

12. The device of claim 11 where the second signal is received in an Out-of-Band (OOB) channel.

13. The device of claim 11 where the second signal is received in a DOCSIS 3.1 PHY Link Control (PLC) channel.

14. The device of claim 11 where the second signal is received in a DOCSIS 3.1 subcarrier.

15. The device node of claim 11 where the second signal is received in a DOCSIS 3.1 pilot.

16. The device of claim 9 comprising a node.

17. The device of claim 9 comprising an amplifier.

18. The method of claim 1 where the downstream device is a node.

19. The method of claim 1 where the downstream device is an amplifier.

* * * * *